United States Patent Office 3,064,051
Patented Nov. 13, 1962

3,064,051
QUATERNARY SALTS OF $N_1$-ALKANOYL-$N_2$-DIMETHYL HYDRAZINE
James M. Sprague, Gwynedd Valley, and Edward J. Cragoe, Jr., Lansdale, Pa., assignors to Merck & Co., Inc., Rahway, N.J., a corporation of New Jersey
No Drawing. Filed Jan. 3, 1961, Ser. No. 79,953
7 Claims. (Cl. 260—562)

This invention relates to new anti-hypertensive agents. More specifically, this invention relates to hydrazonium salts of the formula

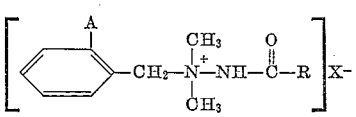

in which A is halogen, nitro, lower alkyl or trifluoromethyl, R may be hydrogen or lower alkyl and $X^-$ is an anion.

Many anti-hypertensive agents used in the past have been merely antagonists in the living system to the naturally occurring pressor agents. There have recently been introduced anti-hypertensive agents which act in some way to block the formation of natural pressor agents such as norepinephrine and the like. Some of the most promising of these recent anti-hypertensive agents had possessed serious disadvantages. Among these disadvantages have been a poor absorption when administered orally, acutely toxic side effects, erratic activity and activity of short duration accompanied by brief initial pressor action.

We have found a new class of compounds, as defined above, which have a number of very important advantages over products heretofore known. Among these advantages one very important one is that they have very high oral absorption, unlike the products heretofore available. They further show a very low toxicity. It is a further advantage that their activity is much more prolonged than the prior products. There is a still further advantage of the compounds of our invention in that the high oral absorption produces less erratic activity which is free of any initial pressor activity.

The compounds of our invention are acylhydrazonium salts of the formula

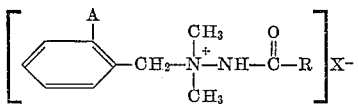

They are, in general, prepared by the reaction of an acylated di-substituted hydrazine with a quaternizing agent. The preferred method of synthesis consists of interacting an o-substituted-benzyl halide with a 1,1-dimethyl-2-acylhydrazine.

The benzyl halides which are used as the quaternizing agent in the final step in the preparation of the compounds of our invention must have an ortho substituent. The presence of such a substituent is quite specific for the desired activity. The substituent may be a halogen such as fluorine, chlorine, bromine or iodine (preferably bromine), or a lower alkyl group such as methyl or ethyl, propyl, butyl (preferably methyl) or a nitro or a trifluoromethyl group. In general, we prefer the o-bromo compounds. Thus, we can, for example, use o-bromobenzyl chloride or bromide, o-iodobenzyl bromide or chloride, or iodide, o-chlorobenzyl chloride or bromide, o-fluorobenzyl bromide or chloride, o-methylbenzyl bromide, o-ethylbenzyl bromide, o-nitrobenzyl bromide and o-trifluoromethylbenzyl bromide.

Before quaternization can be carried out, it is necessary that the substituted hydrazine be acylated to form the intermediate which we use to react with the quaternizing agent. The acylation is carried out using reagents normally used for acylating an amino nitrogen. Such agents include acetyl chloride, acetic anhydride, propionyl chloride, propionic anhydride, butyryl chloride, butyric anhydride, caproic anhydride, methyl formate and the like. We especially prefer to use, as the acyl group, a formyl group since the formyl derivatives appear to be the most useful in that their oral absorption is remarkably high. The formyl compounds are prepared by formylating, e.g., with methyl formate.

The quaternization is usually carried out without a solvent. However, one can use a solvent such as benzene, methanol, acetone or the like. It is generally preferred to use the reactant as the vehicle for reaction, especially when the quaternizing agent is a benzyl halide. These are then used in slight excess in order to provide the vehicle and the acylated dialkylhydrazine is mixed therewith. The reaction can be run at room temperature, but it is generally better to heat the reaction mixture slightly in order to speed up the reaction. The temperature should be kept below 65° (preferably below 50°). The reason for keeping the temperature low is that at higher temperatures there may be some decomposition to a product or products which may be difficult to separate. The quaternary salts of our invention are generally sensitive to heat. Therefore, even after preparation they should not be heated. The conditions of quaternization must represent a balance of time and temperature, since the rate of reaction is slow at low temperatures and decomposition occurs at high temperatures.

In general, the acylhydrazine is mixed with the benzyl halide and the mixture is heated for a short time to a temperature of about 50° in order to effect complete solution. The mixture is then cooled and the product is isolated, either as it solidifies in the reaction mixture or by trituration of the reaction mass with a solvent such as acetone which extracts excess reagents. When the reaction is run in a solvent in which the product is soluble, the latter may be precipitated by the addition of another solvent such as ether. Therefore, the described procedure serves as a method of isolation of the desired product.

The crude products can be recrystallized by dissolving them in a solvent such as alcohol and slowly reprecipitating them by gradual addition of a solvent such as ether.

The anions necessary in the compounds of our invention, since they are salts, can be any of a number of pharmaceutically accepted anions. It is usually preferable to use one which gives a water-soluble salt. The compounds of our invention are usually obtained as the halides, since quaternization is usually carried out with a benzyl halide. No matter what anion is formed by the original quarternization, other anions can readily be introduced by passing aqueous solutions of the salt through a basic ion exchange resin such as the base form of Amberlite IRA 400 to form a hydrazonium hydroxide which can then be titrated with an acid to give any other salt desired. Other salts are also preparable from the salts obtained in the quaternization by double decomposition in solution with inorganic or organic salts of the other anions. Such a transformation depends on the relative solubilities of the salts involved, it being necessary that the desired product of the exchange be the least soluble species in the system.

The products of our invention can be administered parenterally or orally. They can be administered by themselves or in a mixture with pharmaceutically accepted carriers. Thus, one can make solutions, syrups, pills, tablets or capsules. In the preparation of such mixtures, one should avoid any process involving heating due to the above-mentioned sensitivity toward decomposition. The compounds of our invention can be administered orally, in solution or in the form of pills, tablets, or capsules as unit dosages. In human usage, the total daily dosage range is 200–1500 mg. orally, or parenterally, given in divided doses.

Our invention can be illustrated by the following examples:

Example 1

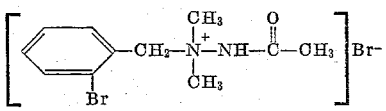

A mixture of 6.95 g. of 1,1-dimethyl-2-acetylhydrazine (cf. Richard L. Hinman, J. Am. Chem. Soc. 78, 1645 (1956)), 18.75 g. of o-bromobenzyl bromide and 50 ml. of acetone is heated to reflux under anhydrous conditions for one hour. Ether (15 ml.) is added to the cooled reaction mixture and the white solid is isolated by filtration, M.P. 117–118° C. The quaternary salt, 1-(o-bromobenzyl)-1,1-dimethyl-2-acetylhydrazonium bromide, so obtained may be recrystallized by dissolving it in hot acetone and adding anhydrous ether to the solution, M.P. 119–120° C. *Analysis.*—Calculated for $C_{11}H_{16}Br_2N_2O$: C, 37.52; H, 4.58; Br, 45.39; N, 7.96. Found: C, 37.23; H, 4.88; Br, 45.45; N, 8.06.

Example 2

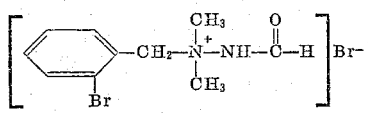

A mixture of 11.98 g. of 1,1-dimethyl-2-formylhydrazine (cf. R. T. Beltrami and E. R. Bissell, J. Am. Chem. Soc., 78, 2467 (1956)) and 37.50 g. of o-bromo-benzyl bromide is prepared in a beaker surrounded by an oil bath held at 42° C. The mixture is agitated and the temperature of the bath is raised to 50° C. Within five minutes the solid dissolves and the reaction mixture is immediately cooled. If necessay, it is seeded and upon chilling it solidifies. The solid reaction mixture is finely ground and washed with acetone to give crude product melting at 100–104° C. It may be recrystallized in the cold by dissolving in anhydrous methanol and slowly adding anhydrous ether. The 1-(o-bromobenzyl)-1,1-dimethyl-2-formylhydrazonium bromide is then isolated by filtration, M.P. 105–107° C. *Analysis.*—Calculated for $C_{10}H_{14}Br_2N_2O$: C, 35.53; H, 4.17; Br, 47.28; N, 8.29. Found C, 35.82; H, 4.23; Br, 47.01; N, 8.35.

Example 3

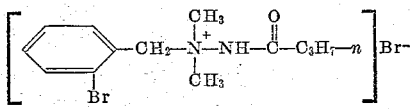

The intermediate, 1,1-dimethyl-2-butyrylhydrazine, is prepared as follows:

To a solution of 19.83 g. of 1,1-dimethylhydrazine in 50 ml. of benzene, there is added 63.28 g. of butyric anhydride in small proportions with agitation and cooling over a period of 15 minutes. The resulting solution is heated under reflux, under anhydrous conditions for one hour. The volatile materials are then removed under reduced pressure and the residual oil is distilled through a distillation column. The liquid product, boiling at 105–118° C. at 16 mm. is collected, $n_D^{25}$ 1.4484. Refractionation gives a colorless liquid, B.P. 115–117.5° C. at 16 mm., $n_D^{25}$ 1.4502. *Analysis.*—Calculated for $C_6H_{14}N_2O$: C, 55.35; H, 10.84; N, 21.52. Found: C, 55.97; H, 11.03; N, 20.84.

A mixture of 7.81 g. of the above-prepared 1,1-dimethyl-2-butyrylhydrazine, 16.50 g. of o-bromobenzyl bromide and 50 ml. of tertiary-butyl alcohol is heated under reflux under anhydrous conditions for 30 minutes. The reaction mixture is then cooled and ether is added to precipitate the product, M.P. 98–101° C. The quaternary salt, 1-(o-bromobenzyl)-1,1-dimethyl-2-butyrylhydrazonium bromide, can be recrystallized by dissolving it in warm ethanol and adding anhydrous ether or it can be done in the cold by dissolving in anhydrous methanol and adding anhydrous ether slowly to precipitate needles, M.P. 103.5–105° C. *Analysis.*—Calculated for $C_{13}H_{20}Br_2N_2O$: C, 41.07; H, 5.30; N, 7.37. Found: C, 41.17; H, 5.35; N, 7.26.

Example 4

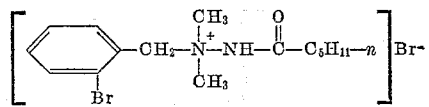

The intermediate, 1,1-dimethyl-2-caproylhydrazine, is prepared as follows:

To a solution of 24.63 g. of 1,1-dimethylhydrazine in 50 ml. of benzene is added 85.72 g. of caproic anhydride gradually with agitation and cooling over a period of 20 minutes. The resulting solution is heated under reflux under anhydrous conditions for one hour. The volatile materials are removed under reduced pressure and the residual oil distilled through a column. The material which boils at 136–138° C. at 14 mm. is collected, $n_D^{25}$ 1.4513. After two refractionations, there is obtained a liquid boiling at 142.5° C. at 17 mm., $n_D^{25}$ 1.4523. *Analysis.*—Calculated for $C_8H_{18}N_2O$: C, 60.72; H, 11.47; N, 17.70. Found: C, 59.56; H, 11.46; N, 17.64.

A mixture of 7.91 g. of the above-prepared 1,1-dimethyl-2-caproylhydrazine and 13.75 g. of o-bromobenzyl bromide is stirred together and allowed to stand overnight in a stoppered flask at room temperature. The reaction mixture then solidifies and is finely ground and washed with ether. The quaternary salt, 1-(o-bromobenzyl) - 1,1 - dimethyl - 2 - caproylhydrazonium bromide, thus obtained, can be recrystallized by dissolving in absolute ethanol and slowly adding anhydrous ether. M.P. 99–99.5°. *Analysis.* — Calculated for $C_{15}H_{24}Br_2N_2O$: C, 44.14; H, 5.93; N, 6.86. Found: C, 44.32; H, 5.98; N, 6.85.

Example 5

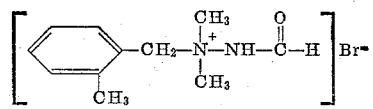

The procedure of Example 2 is followed using an equivalent quantity of o-methylbenzyl bromide in place of the o-bromobenzyl bromide. The product is 1-(o-methylbenzyl) - 1,1 - dimethyl - 2 - formylhydrazonium bromide. A crude product melting at 94–113.5° C. is obtained. The recrystallized product melts at 117.5–119.5° C. *Analysis.*—Calculated for $C_{11}H_{17}BrN_2O$: C, 48.36; H, 6.27; N, 10.26. Found: C, 48.48; H, 6.30; N, 10.15.

When o-ethylbenzyl bromide is substituted in equivalent quantities in the procedure of Example 2 for the o-bromobenzyl bromide, there is obtained 1-(o-ethylbenzyl)-1,1-dimethyl-2-formylhydrazonium bromide.

Example 6

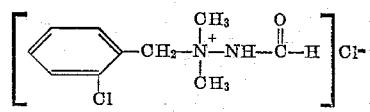

Finely ground 1,1-dimethyl-2-formylhydrazine (5.99 g.) and 12.08 g. of o-chlorobenzyl chloride are mixed in a flask surrounded by an oil bath at 42° C. The mixture is agitated while the temperature of the bath is raised to 50°. The solid dissolves within about five minutes. The reaction flask is then stoppered and placed in an oven at 56° C. where it is allowed to stand for about 18 hours. It is then removed from the oven and allowed to stand for about 48 hours at room temperature. The reaction mixture solidifies. It is pulverized and washed with acetone. The crude product thus obtained, M.P. 76–91° C., can be recrystallized by dissolving in cold absolute ethanol and adding anhydrous ether to yield 1 - (o - chlorobenzyl) - 1,1 - dimethyl - 2 - formylhydrazonium chloride, M.P. 104–105.5° C. *Analysis.*—Calculated for $C_{10}H_{14}N_2Cl_2O$: C, 48.21; H, 5.66; N, 11.24. Found: C, 48.03; H, 5.97; N, 11.14.

When, in the above procedure, 15.41 g. of o-chlorobenzyl bromide is used in place of the o-chlorobenzyl chloride, the corresponding bromide salt is obtained—M.P. 106–107° C. Similarly, when o-iodobenzyl bromide or o-fluorobenzyl chloride is used in equivalent quantities in the above procedure, in place of the o-chlorobenzyl chloride, there is obtained 1-(o-iodobenzyl)-1,1-dimethyl-2-formylhydrazonium bromide or 1-(o-fluorobenzyl)-1,1-dimethyl-2-formylhydrazonium chloride.

*Example 7*

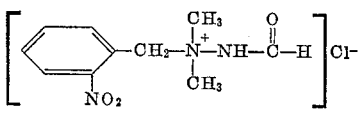

The procedure of Example 2 is followed using an equivalent quantity of o-nitrobenzyl chloride in place of the o-bromobenzyl bromide to obtain 1-(o-nitrobenzyl)-1,1-dimethyl-2-formylhydrazonium chloride.

*Example 8*

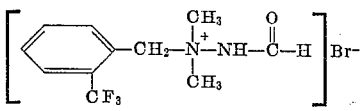

The procedure of Example 2 is followed using an equivalent quantity of o-trifluoromethylbenzyl bromide (R. Filler and H. Novar, J. Org. Chem., 25, 733 (1960)) in place of the o-bromobenzyl bromide to obtain 1-(o-trifluoromethylbenzyl)-1,1-dimethyl - 2 - formylhydrazonium bromide.

We claim:
1. A compound of the formula

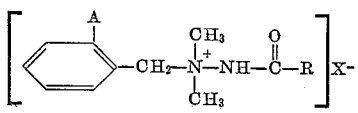

in which A is selected from the group consisting of halogen, nitro, lower alkyl and trifluoromethyl, R is selected from the group consisting of hydrogen and lower alkyl and X⁻ is an pharmaceutically acceptable anion.

2. The compound of the formula

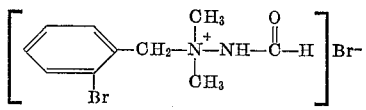

3. The compound of the formula

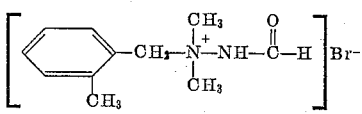

4. The compound of the formula

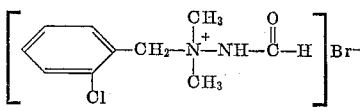

5. The compound of the formula

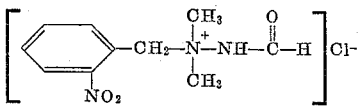

6. The compound of the formula

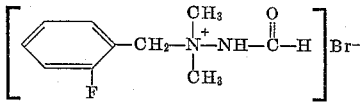

7. The compound of the formula

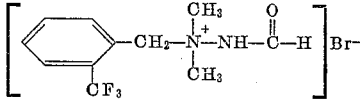

References Cited in the file of this patent

UNITED STATES PATENTS 2,951,078     Biel _____ Aug. 30, 1960

OTHER REFERENCES

Beltromi et al.: J. Am. Chem. Soc., vol. 78, pages 2467–68 (1956).